(12) United States Patent
Fitzpatrick

(10) Patent No.: US 6,547,259 B2
(45) Date of Patent: Apr. 15, 2003

(54) MASTER AND INSERT JAW SYSTEM

(75) Inventor: Michael Fitzpatrick, Troy, MI (US)

(73) Assignee: Dura-Hog, Inc., Troy, MI (US)

( * ) Notice: Subject to any disclaimer, the term of this patent is extended or adjusted under 35 U.S.C. 154(b) by 0 days.

(21) Appl. No.: 09/966,517

(22) Filed: Sep. 28, 2001

(65) Prior Publication Data

US 2002/0038939 A1 Apr. 4, 2002

Related U.S. Application Data

(60) Provisional application No. 60/237,923, filed on Oct. 4, 2000.

(51) Int. Cl.$^7$ ............................................. B23B 31/16
(52) U.S. Cl. ...................... 279/123; 279/153; 279/154; 269/262; 269/282; 411/999
(58) Field of Search ................. 279/123, 124, 279/152–154; 269/259–264, 271, 279–284; 411/999

(56) References Cited

U.S. PATENT DOCUMENTS

| | | | | |
|---|---|---|---|---|
| 2,925,282 A | * | 2/1960 | Borsetti ...................... | 279/154 |
| 2,950,117 A | * | 8/1960 | Walmsley ................... | 279/154 |
| 3,190,666 A | * | 6/1965 | Testa .......................... | 279/154 |
| 3,744,808 A | * | 7/1973 | Hughes ....................... | 279/154 |
| 3,812,895 A | * | 5/1974 | Smith ......................... | 411/999 |
| 4,041,612 A | * | 8/1977 | Skubic ........................ | 279/154 |
| 4,706,973 A | * | 11/1987 | Covarrubias et al. ....... | 279/153 |
| 4,861,048 A | * | 8/1989 | Slater .......................... | 279/123 |
| 5,155,898 A | * | 10/1992 | Gutierrez .................... | 279/154 |
| 5,984,321 A | * | 11/1999 | Gruttadauria ............... | 279/153 |

OTHER PUBLICATIONS

ATS Workholding advertisement.
Huron Machine Products advertisement (Keep Those Machines Turning).
Ton Fou Enterprise Co., Ltd. advertisement.
Hardinge Woodworking Products advertisement.
Huron Machine Products and advertisement (Top Jaw Checklist).
Superior Cincinnati advertisement.
Quentes Sensitive Material Clamp advertisement.
Schunk Precision Woodworking Systems advertisement (Chuck Jaws).
Buck Forkardt advertisement.
TKK Chuck Advertisement.
Abbott Workholding Products Advertisement.
Schunk Precision Workholding Systems advertisement (Tora–NCK and Claw Jaws).
Jergens advertisement.
NorthTech Workholding advertisement.

* cited by examiner

*Primary Examiner*—Steven C. Bishop
(74) *Attorney, Agent, or Firm*—Carlson Gaskey & Olds PC

(57) ABSTRACT

The jaw assembly includes a master jaw and an insert jaw. An engagement surface on the master jaw provides a mounting surface for the insert jaw. The master jaw is contoured to provide a minimum of mass opposite the mounting surface and opposite the engagement surface to minimize the total rotating mass when the jaw assembly is in operation. In operation, a force is applied substantially perpendicular to the engagement surfaces between the insert jaw and master jaw such that the engagement surface experiences the force rather than the insert fastener.

29 Claims, 5 Drawing Sheets

MASTER AND INSERT JAW SYSTEM

The present application claims priority to U.S. Provisional Patent Application Serial No. 60/237,923, filed Oct. 4, 2000.

BACKGROUND OF THE INVENTION

The present invention relates to a power chuck, and more particularly to a master jaw which receives one of a plurality of insert jaws to retain a work piece without the necessity of repetitively attaching an entire jaw assembly to a power chuck.

Jaw assemblies are typically mounted to a rotatable chuck to retain a work piece so that machining operations can be performed thereon. Typically, each jaw assembly is tailored to a single particular work piece. To change over from one work piece to another the jaw assemblies must be replaced by another jaw assembly, which is tailored to the new work piece. Replacing a jaw assembly commonly requires removing a plurality of fasteners and replacing one jaw assembly with another. This is time consuming and requires care to accurately relocate the jaw assembly.

Accordingly, it is desirable to provide a jaw assembly that provides a quick and accurate changeover for a multiple of work pieces.

SUMMARY OF THE INVENTION

The jaw assembly according to the present invention includes a master jaw and an insert jaw. The jaw assembly is configured to retain a particular work piece such that only the insert jaw need be replaced when a changeover between one work piece to another is desired.

An engagement surface on the master jaw provides a mounting surface for an insert jaw. An insert fastener is mounted through an inset aperture centrally located through the engagement surface such that the insert jaw is reversibly mountable to engagement surface to thereby double the applications for each insert jaw. The master jaw is contoured to provide a minimum of mass opposite the mounting surface and opposite the engagement surface to minimize the total rotating mass when the jaw assembly is in operation.

In operation a force is applied substantially perpendicular to the engagement surfaces between the insert jaw and master jaw such that the engagement surface experiences the force rather than an insert jaw fastener. The insert fastener thereby need not be subjected to the substantial forces caused by machining operations. Excellent repeatability and concentricity is also maintained.

In another embodiment of the present invention a tension ring is positionable upon the master jaw such that removable alignment pegs fit within a corresponding alignment slot. Each alignment slot is preferably helically arranged on the ring such that the ring is adjustably located upon the pegs to provide an inward radial tension on the jaw assemblies which allows the insert jaws to be accurately machined to a desired shape to receive a specific work piece.

The present invention therefore provides a jaw assembly that provides a quick and accurate changeover for a multiple of work pieces.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
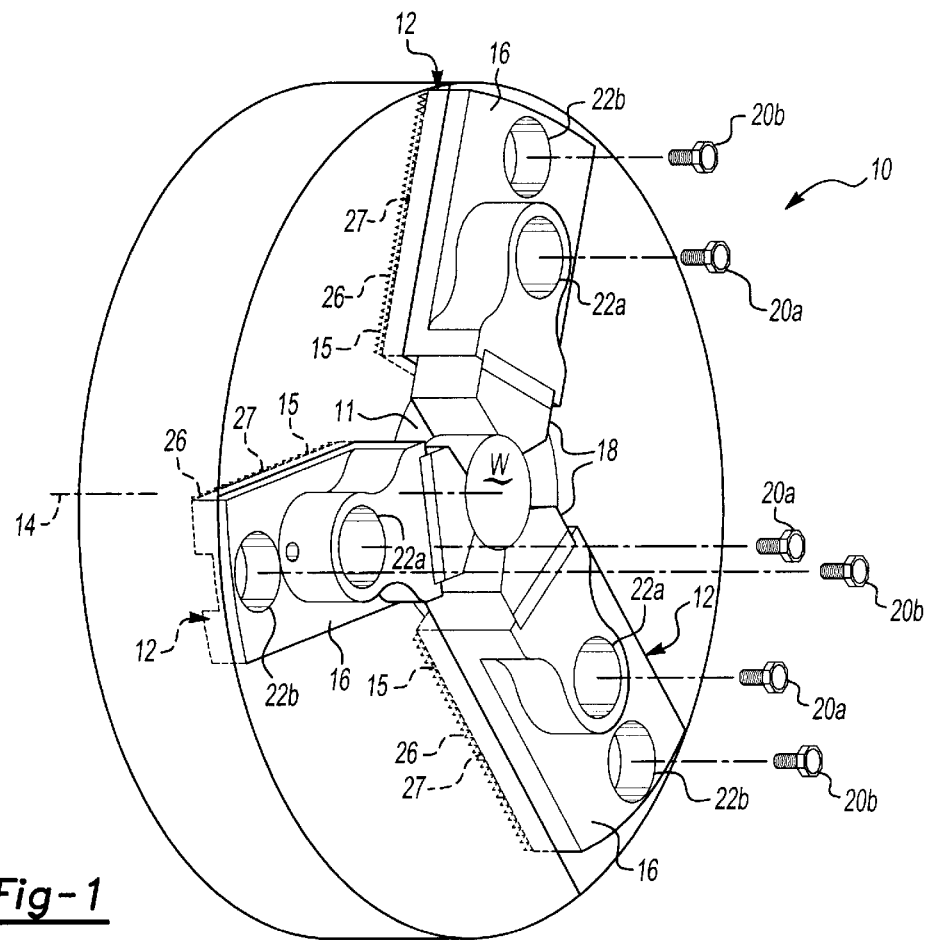
FIG. 1 is a general perspective view of a chuck assembly having jaw assemblies according to the present invention.

FIG. 1 illustrates a power chuck assembly 10 for a machine. The chuck 10 provides a rotatable mounting surface for a plurality of jaw assemblies 12 which retain a work piece W. Work piece W may also at least partially extended through a central chuck aperture 11. The chuck 10 is rotatable about an axis 14 by a machine (not shown) such as a milling machine, lathe machine or other rotatable chuck machine so that machining operations can be performed upon the rotating work piece W.

Preferably, each jaw assembly 12 includes a master jaw 16 and an insert jaw 18. The master jaw 16 is retained to the chuck 10 by fasteners 20A, 20B which are received through apertures 22A, 22B in the master jaw 16. Fasteners 20A, 20B are typically received within a movable chuck portion of the chuck 10.

A plurality of teeth 26 are formed into a mounting surface 27 of the master jaw 16 to engage a plurality of corresponding chuck teeth 15 to assist in the positioning and retention of the jaw assemblies 12. As will be further described below, the jaw assembly 12 is configured to retain a particular work piece W such that only the insert jaw 18 need be replaced when a changeover between one work piece W to another is desired.

Figure 2A:
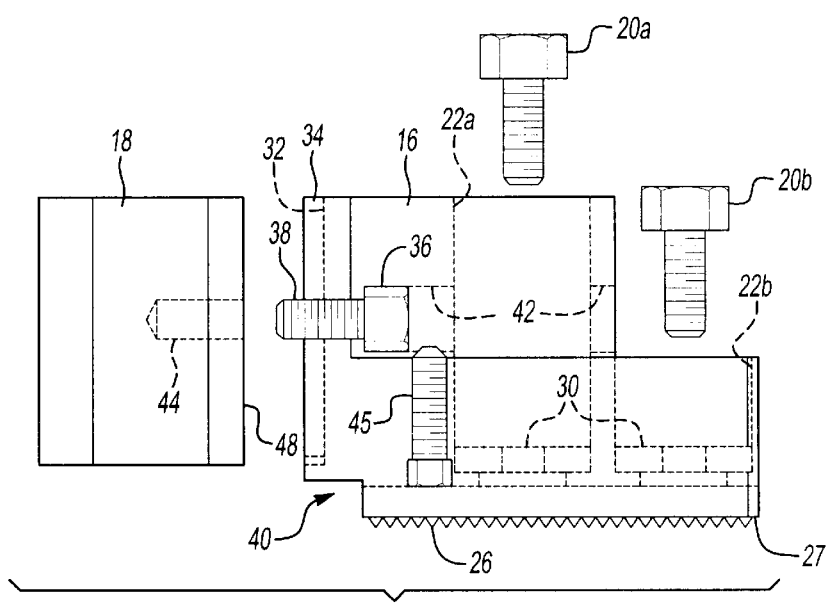
FIG. 2A is a partial phantom side view of a master jaw.
Figure 2B:
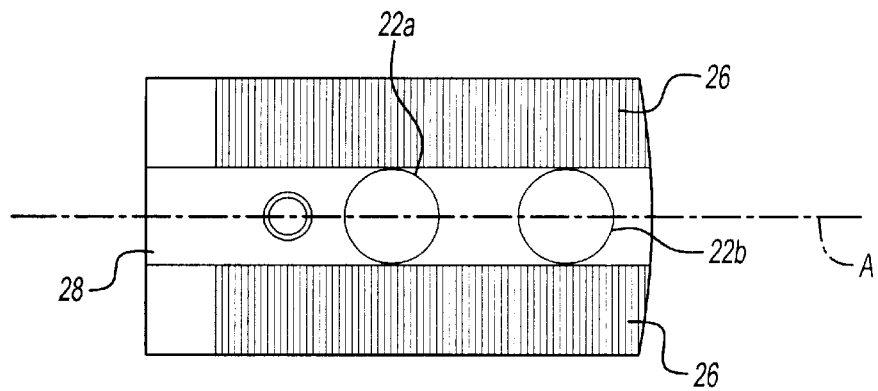
FIG. 2B is a bottom view of the master jaw illustrated in FIG. 2A.

Referring to FIG. 2A, the master jaw 16 includes the plurality of teeth 26 which engage corresponding teeth on the chuck 10 (FIG. 1) in a known manner. The plurality of teeth 26 are preferably arranged as two sets in a substantially parallel relationship relative to a longitudinal centerline A (FIG. 2B). Apertures 22A, 22B are preferably located along the longitudinal centerline A and are recessed within a slot 28 (also shown in FIG. 2C). As is known, an engagement member (not shown) fits within slot 28 and engages the chuck 10 (FIG. 1). Preferably, a removable hardened washer 30 fits within each aperture 22A, 22B to minimize wear on the master jaw 16 during repeated engagement of fasteners 20A, 20B.

Figure 2C:
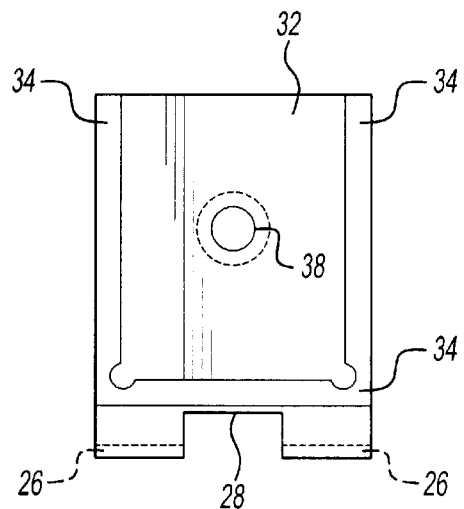
FIG. 2C is a front view of the master jaw illustrated in FIG. 2A.

An engagement surface 32 provides a mounting surface for each insert jaw 18. The engagement surface 32 is located substantially perpendicular to longitudinal centerline A and preferably includes a plurality of guides 34 (FIG. 2C). Guides 34 extend from engagement surface 32 such that each insert jaw 18 closely fits adjacent the guides 34 and is located against engagement surface 32.

An insert fastener 36 is mounted through an inset aperture 38 located substantially parallel to longitudinal axis A and perpendicular to engagement surface 34. Insert aperture 38 is preferably centrally located through engagement surface 34 (FIG. 2C). As will be further described, by centrally locating insert aperture 38 (FIG. 2C) in engagement surface 32, the insert jaw 18 (FIG. 3) is reversibly mountable to engagement surface 32 to thereby double the applications for each insert jaw 18.

A clearance 40 is preferably provided adjacent mounting surface 27 to extend the engagement surface 32 away from the plurality of teeth 26. Clearance 40 provides clearance for a cap (not shown) mounted on the power chuck 10. Engagement surface 32 and the attached insert jaw 18 are thereby locatable over the central chuck aperture 11 such that a through bore can pass entirely through the work piece without contacting the chuck 10 (FIG. 1).

Figure 3:
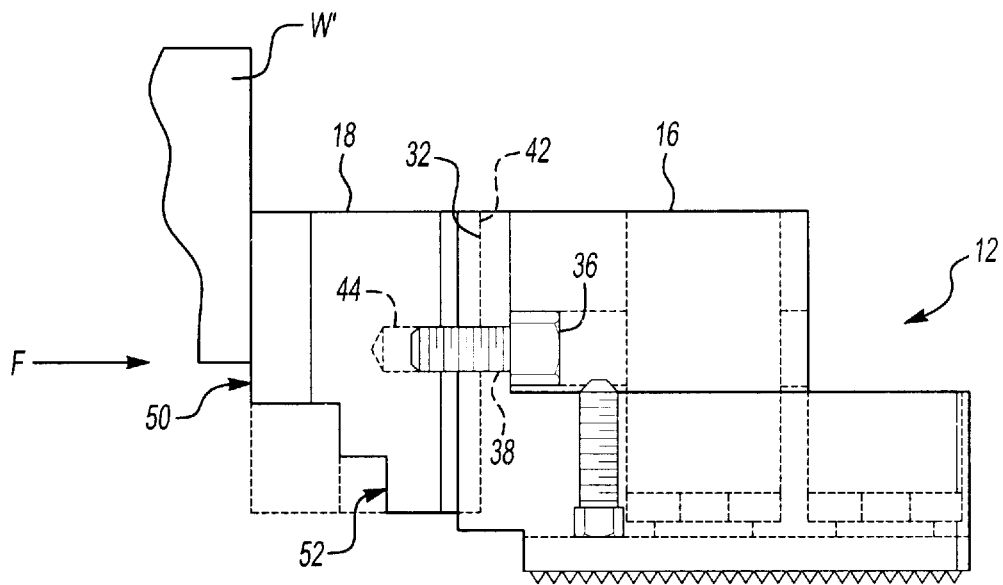
FIG. 3 is a jaw assembly according to the present invention illustrating the insert jaw mounted to the master jaw.

Insert fastener 36 is preferably a threaded hex fastener or the like which is engageable by a tool (not shown) through an aperture 42 to engage a threaded aperture 44 in the insert jaw 18 (FIG. 3). Aperture 42 is located substantially parallel to longitudinal centerline A and is of a diameter which allows removal of the insert fastener 36. A threaded ball plunger 45 extends into aperture 42 to prevent inadvertent loss or removal of insert fastener 36. Ball plungers are known and typically include a movable spring-loaded member which must be subjected to a particular directional force to be overcome. The ball plunger 45 thereby provides for user-friendly purposeful removal of insert fastener 36 while preventing inadvertent loss thereof.

Figure 2D:
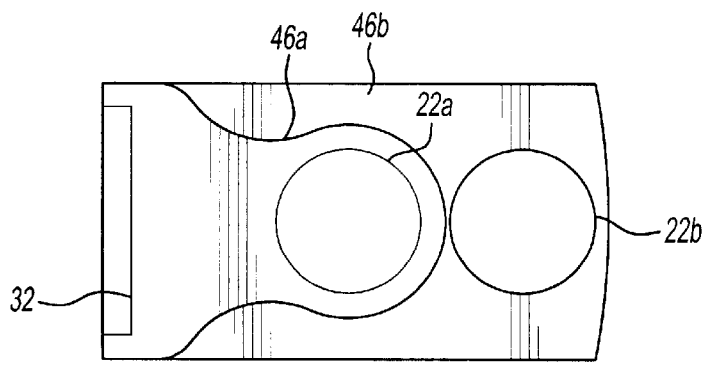
FIG. 2D is a top view of the master jaw illustrated in FIG. 2A.

The master jaw 16 is contoured to provide a minimum of mass opposite the plurality of teeth 26 and opposite engagement surface 32 to minimize the total rotating mass when the jaw assembly 12 is in operation. The master jaw 16 preferably includes a contoured portion 46A (FIG. 2D) which extends from a base portion 46B. The relatively higher (from the chuck) contoured portion 46A reduces rotational mass of the master jaw 16 while the relatively lower base portion 46B provides a larger mounting surface 27 (FIG. 2A.) The contoured portion 46 is preferably just large enough to form aperture 22A and the engagement surface 32. It should be understood that although a particular contoured and base portion are illustrated, other shapes that advantageously reduce rotational mass will also benefit from the present invention.

Insert jaw 18 provides an insert engagement surface 48 which corresponds to engagement surface 32 and which fits adjacent guides 34. Notably, the threaded aperture 44 is centrally located in the insert engagement surface 48.

Referring to FIG. 3, insert jaw 18 is mounted to the master jaw 16. To retain the insert jaw 18 to the master jaw 16, insert fastener 36 is passed through aperture 38 to engage the threaded aperture 44.

A force F is applied when the jaw assemblies 12 are in operation (FIG. 1) and gripping a work piece W. Force F is substantially perpendicular to the engagement surfaces 32, 48. As the engagement surfaces 32, 48 are substantially perpendicular to the force F, engagement surfaces 32, 48 experiences force F rather than insert fastener 36. Insert fastener 36 need only retain insert jaw 18 to master jaw 16 without being subjected to forces applied during machining operations. By providing a single insert fastener 36, rapid changeover is further facilitated. Excellent repeatability and concentricity is also maintained.

Figure 4:
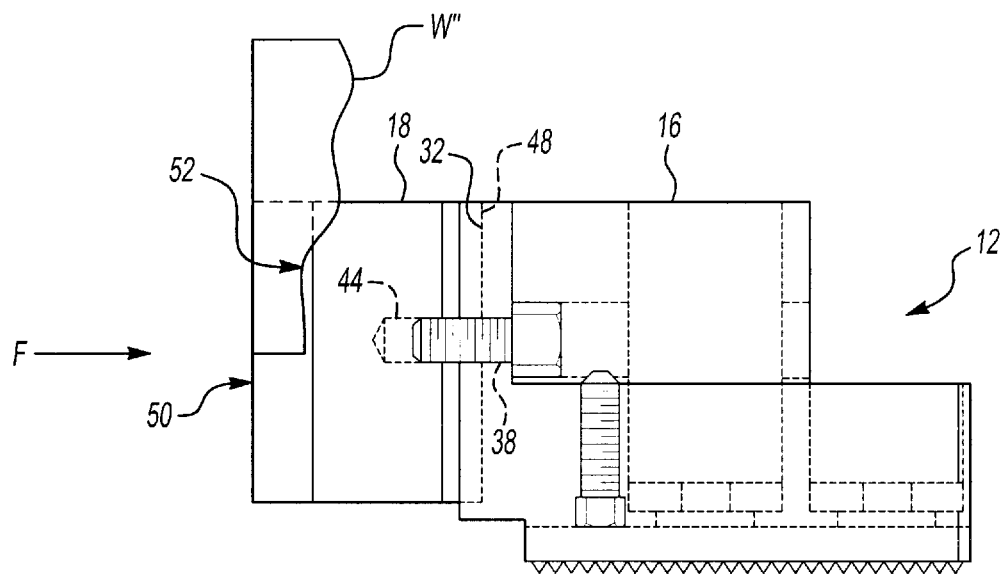
FIG. 4 is a jaw assembly according to the present invention illustrating the insert jaw of FIG. 3 reversed and mounted to the master jaw.

Insert jaw 18 preferably includes a first work piece engagement surface 50 and a second work piece engagement surface 52. The first work piece engagement surface 50 is contoured to receive a first work piece W' (FIG. 3) and the second work piece engagement surface 52 is contoured to receive a second work piece W" (FIG. 4).

As the insert aperture 38 in engagement surface 32, and the treaded aperture 44 in the insert engagement surface 48 are centrally located, a single insert jaw 18 is reversible (FIG. 3 and FIG. 4) to thereby double the applications for each insert jaw 18. In other words, when the first work piece W' is to be used, the insert jaw 18 is oriented as in FIG. 3 and when the second work piece work piece W" is to be used, the insert jaw 18 is reversed and oriented as in FIG. 4.

Figure 5:
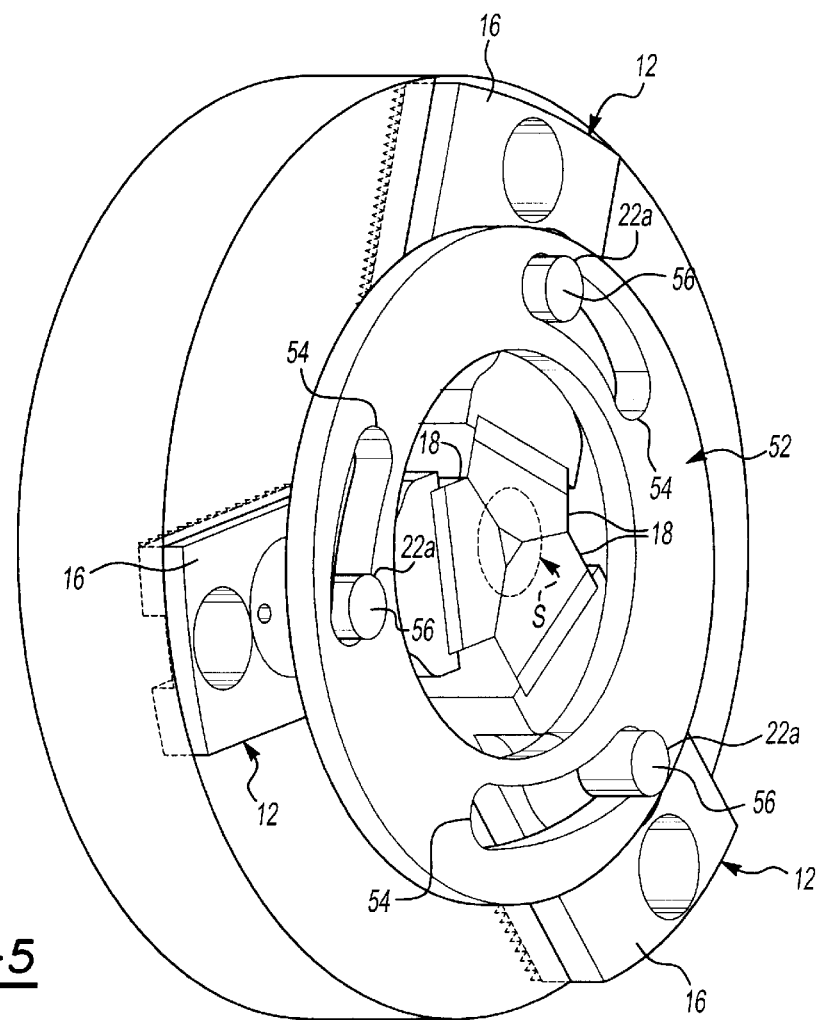
FIG. 5 is a tension ring for use with jaw assembly according to the present invention.

Referring to FIG. 5, a tension ring 52 is illustrated. The tension ring 52 includes a plurality of alignment slots 54. An alignment peg 56 preferably closely fits within each aperture 22A of each master jaw 16. Aperture 22A is thus preferably machined to tightly retain removable alignment peg 56.

Tension ring 52 is positioned upon the master jaw 16 such that each alignment peg 56 fits within a corresponding alignment slot 54. Each alignment slot 54 is preferably helically arranged on the ring 52 such that the ring 52 is adjustably located upon the pegs 56 to provide an inward radial tension on the jaw assemblies 12. By providing this tension, the insert jaws 18 can be accurately machined to a desired shape S to receive a particular work piece.

Figure 6A:
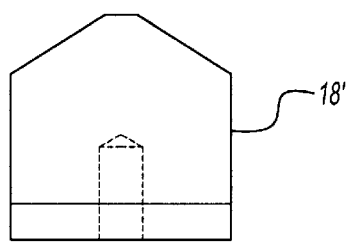
FIG. 6A is another embodiment of the insert jaw.
Figure 6B:
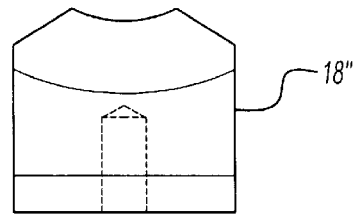
FIG. 6B is another embodiment of the insert jaw.

It will be understood that a multiple of insert jaws having a multiple of engagement surfaces will benefit from the present invention. FIGS. 6A and 6B illustrate additional embodiments of an insert jaw 18' and 18" according to the present invention. For example only, insert jaw 18' is an insert jaw blank and insert jaw 18" is an insert jaw machined, preferably with the tension ring of FIG. 5, to receive a particular work piece.

Figure 7:
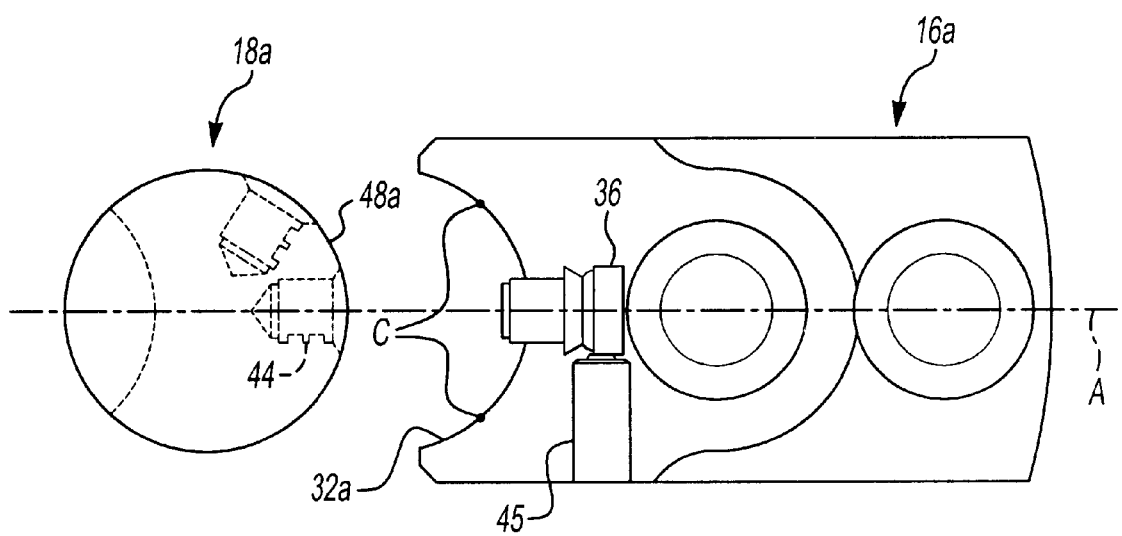
FIG. 7 is yet another embodiment a jaw assembly according to the present invention.

Referring to FIG. 7, another embodiment of the master jaw 16A and insert jaw 18A is disclosed. It should be understood that the FIG. 7 embodiment operates substantially as the embodiments described above including the ability for the insert jaw 18A to provide multiple work piece engagement surfaces as described above. It should be understood that although the insert jaw 18A is illustrated in the disclosed embodiment as substantially cylindrical, the work piece engagement surfaces may alternatively or additionally be tailored to the particular work piece as described above.

Preferably, the master jaw 16A includes a master jaw arcuate engagement surface 32A to receive a substantially cylindrical insert jaw 18A having an arcuate insert engagement surface 48A. Preferably, the radius of the arcuate insert engagement surface 48A is larger than the radius of the arcuate engagement surface 32A. The arcuate insert engagement surface 48A of the insert jaw 18A is therefore self centering into the arcuate engagement surface 32A. That is, the cylindrical insert jaw 18A provides tangential line contact (illustrated schematically at C) against the master jaw 16A on each side of axis A. Moreover, while providing improved centering, the substantially cylindrical insert jaw 18A minimizes manufacturing expenses.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A jaw assembly comprising:
    a master jaw comprising a mounting surface having a plurality of teeth and a first and a second mounting aperture therethrough, said first mounting aperture through a contoured portion and a base portion, said second aperture through said base portion, said contoured portion at least partially surrounding said first mounting aperture, said contoured portion extending from said base portion to define an engagement surface substantially perpendicular to said mounting surface; and
    an insert jaw removably attachable to said master jaw at said engagement surface, said engagement surface substantially perpendicular to a retention force applied by said insert jaw.

2. The jaw assembly as recited in claim 1, wherein said insert jaw includes a threaded aperture substantially perpendicular to said engagement surface and said master jaw includes a fastener aperture alignable with said threaded aperture.

3. The jaw assembly as recited in claim 2, further including a retainer extending into said fastener aperture.

4. The jaw assembly as recited in claim 3, wherein said retainer includes a ball plunger.

5. The jaw assembly as recited in claim 1, further including an alignment peg receivable within said first aperture adjacent a first fastener.

6. The jaw assembly as recited in claim 1, wherein said first and second mounting apertures are aligned along a longitudinal centerline and located within a slot in said mounting surface.

7. The jaw assembly as recited in claim 1, wherein said mounting surface defines a clearance adjacent said engagement surface.

8. The jaw assembly as recited in claim 1, wherein said insert jaw includes a first and second work piece engagement surface.

9. The jaw assembly as recited in claim 1, wherein said engagement surface includes a substantially arcuate master jaw engagement surface and a substantially arcuate insert jaw engagement surface.

10. The jaw assembly as recited in claim 9, wherein said substancially arcuate insert jaw engagement surface defines a insert jaw radius and said substancially, arcuate master jaw engagement surface defines an master jaw radius, said insert jaw radius larger than said master jaw radius.

11. The jaw assembly as recited in claim 1, wherein said engagement surface comprises a substantially arcuate master jaw engagement surface which defines a master jaw radius and a substantially arcuate insert jaw engagement surface which defines an insert jaw radius, said insert jaw radius larger than said master jaw radius.

12. The jaw assembly as recited in claim 1, wherein said contoured portion extends from said base portion to a height equivalent to said engagement surface, said base extending for a height less than said engagement surface.

13. A jaw assembly comprising:
    a master jaw comprising a mounting surface having a plurality of teeth and a first and a second mounting aperture therethrough, said first mounting aperture through a contoured portion and a base portion, said second aperture through said base portion, said contoured portion at least partially surrounding said first mounting aperture, said contoured portion extending from said base portion to define an engagement surface substantially perpendicular to said mounting surface; and
    an insert jaw removably attachable to said master jaw at said engagement surface and substantially perpendicular to a retention force applied by said insert jaw.

14. The jaw assembly as recited in claim 13, wherein said insert jaw includes a threaded aperture substantially perpendicular to said engagement surface and said master jaw includes a fastener aperture alignable with said threaded aperture.

15. The jaw assembly as recited in claim 13, further including an insert retainer passable into a fastener aperture and threadably engageable with said threaded aperture to retain said insert jaw to said master jaw.

16. The jaw assembly as recited in claim 13, further including a removable alignment peg receivable within said first aperture adjacent a first fastener.

17. The jaw assembly as recited in claim 16, further including a tension ring mountable to said alignment peg.

18. The jaw assembly as recited in claim 17, wherein said tension ring includes a plurality of helical slots, each of said helical slots operable to receive a respective alignment peg.

19. The jaw assembly as recited in claim 13, wherein said engagement surface includes a substancially arcuate master jaw engagement surface and a substancially arcuate insert jaw engagement surface.

20. The jaw assembly as recited in claim 19, wherein said substancially arcuate insert jaw engagement surface defines a insert jaw radius and said substancially arcuate master jaw engagement surface defines an master jaw radius, said insert jaw radius larger than said master jaw radius.

21. The jaw assembly as recited in claim 13, wherein said engagement surface comprises a substantially arcuate master jaw engagement surface which defines a master jaw radius and a substantially arcuate insert jaw engagement surface which defines an insert jaw radius, said insert jaw radius larger than said master jaw radius.

22. The jaw assembly as recited in claim 13, wherein said contoured portion extends from said base portion to a height equivalent to said engagement surface, said base extending for a height less than said engagement surface.

23. A chuck assembly comprising:
    a plurality of jaw assemblies, each of said jaw assemblies including a master jaw comprising a mounting surface having a plurality of teeth and a first and a second mounting aperture therethrough, said first mounting aperture through a contoured portion and a base portion, said second aperture through said base portion, said contoured portion at least partially surrounding said first mounting aperture, said contoured portion extending from said base portion to define an engagement surface substantially perpendicular to said mounting surface;
    an insert jaw removably attachable to said master jaw at said engagement surface, said engagement surface substantially perpendicular to a retention force applied by said insert jaw;
    a removable alignment peg mountable into said first aperture of each of said plurality of master jaw assemblies; and
    a tension ring having a plurality of helical slots, each of said helical slots operable to receive a respective removable alignment peg to provide an inward radial tension on each of said insert jaws.

24. The chuck assembly as recited in claim 23, wherein said plurality of jaw assemblies includes three jaw assemblies arranged about an axis of rotation.

25. The jaw assembly as recited in claim 23, wherein said engagement surface includes a substancially arcuate master jaw engagement surface and a substancially arcuate insert jaw engagement surface.

26. The chuck assembly as recited in claim 23, wherein said engagement surface comprises a substantially arcuate master jaw engagement surface which defines a master jaw radius and a substantially arcuate insert jaw engagement surface which defines an insert jaw radius, said insert jaw radius larger than said master jaw radius.

27. The chuck assembly as recited in claim 23, wherein said contoured portion extends from said base portion to a height equivalent to said engagement surface, said base extending for a height less than said engagement surface.

28. A jaw assembly comprising:

a master jaw; and an insert jaw removably attachable to said master jaw at an engagement surface, said engagement surface substantially perpendicular to a retention force applied by said insert jaw, said engagement surface comprises a substantially arcuate master jaw engagement surface which defines a master jaw radius and a substantially arcuate insert jaw engagement surface which defines an insert jaw radius, said insert jaw radius larger than said master jaw radius.

29. A jaw assembly comprising:

a master jaw including a base portion and a contoured portion, said base portion including a mounting surface having a plurality of teeth and said contoured portion defining an engagement surface substantially perpendicular to said mounting surface; and an insert jaw removably attachable to said master jaw at said engagement surface and substantially perpendicular to a retention force applied by said insert jaw, said engagement surface comprises a substantially arcuate master jaw engagement surface which defines a master jaw radius and a substantially arcuate insert jaw engagement surface which defines an insert jaw radius, said insert jaw radius larger than said master jaw radius.

* * * * *

UNITED STATES PATENT AND TRADEMARK OFFICE
CERTIFICATE OF CORRECTION

PATENT NO. : 6,547,259 B2  Page 1 of 1
DATED : April 15, 2003
INVENTOR(S) : Fitzpatrick It is certified that error appears in the above-identified patent and that said Letters Patent is hereby corrected as shown below:

Column 5,
Lines 50 and 51, "substancially" should be -- substantially --.

Column 6,
Lines 29, 30, 33 and 34, substancially" should be -- substantially --.
Line 34, "a" should be -- an --.

Column 7,
Lines 7 and 8, "substancially" should be -- substantially --.

Signed and Sealed this

Twenty-fourth Day of June, 2003

JAMES E. ROGAN
*Director of the United States Patent and Trademark Office*